(12) United States Patent
Tellier et al.

(10) Patent No.: US 10,940,652 B2
(45) Date of Patent: Mar. 9, 2021

(54) DEVICE AND A METHOD FOR REPAIRING A HOLE IN A PART

(71) Applicant: SAFRAN AIRCRAFT ENGINES, Paris (FR)

(72) Inventors: Florian Tellier, Moissy-Cramayel (FR); Adrien Paixao, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 672 days.

(21) Appl. No.: 15/506,585

(22) PCT Filed: Aug. 18, 2015

(86) PCT No.: PCT/FR2015/052217
§ 371 (c)(1),
(2) Date: Feb. 24, 2017

(87) PCT Pub. No.: WO2016/030607
PCT Pub. Date: Mar. 3, 2016

(65) Prior Publication Data
US 2018/0222136 A1 Aug. 9, 2018

(30) Foreign Application Priority Data

Aug. 27, 2014 (FR) ...................................... 1458009

(51) Int. Cl.
*B29C 73/02* (2006.01)
*B05C 5/02* (2006.01)
(Continued)

(52) U.S. Cl.
CPC ........ *B29C 73/025* (2013.01); *B05B 13/0618* (2013.01); *B05C 5/027* (2013.01);
(Continued)

(58) Field of Classification Search
CPC .................................................. B29C 73/025
See application file for complete search history.

(56) References Cited

U.S. PATENT DOCUMENTS

| 3,488,213 A | 1/1970 | Bellato |
| 5,752,657 A | 5/1998 | Hogan et al. |
| 2004/0099699 A1 | 5/2004 | Zubeck |

FOREIGN PATENT DOCUMENTS

| CN | 1086881 A | 5/1994 |
| CN | 201931247 U | 8/2011 |

(Continued)

OTHER PUBLICATIONS

Combined Office Action and Search Report dated Aug. 28, 2018 in Chinese Patent Application No. 201580045591.7 (with English translation of Office Action and English translation of Categories of Cited Documents), 13 pages.

(Continued)

*Primary Examiner* — Larry W Thrower
(74) *Attorney, Agent, or Firm* — Oblon, McClelland, Maier & Neustadt, L.L.P.

(57) ABSTRACT

A repair device for repairing a hole in a part includes a resin tank and an injector endpiece connected to the tank. The endpiece is designed to be inserted in the hole. The endpiece includes at least one injection orifice enabling resin to be injected into at least one cavity situated around the endpiece. The endpiece can be extracted from the hole after the resin has hardened.

10 Claims, 3 Drawing Sheets

(51) Int. Cl.
  *B05C 7/02* (2006.01)
  *B05C 7/00* (2006.01)
  *B05B 13/06* (2006.01)
  *B05C 9/10* (2006.01)
  *B05B 1/14* (2006.01)
  *B29L 31/30* (2006.01)

(52) U.S. Cl.
  CPC .................. *B05C 7/00* (2013.01); *B05C 7/02* (2013.01); *B05B 1/14* (2013.01); *B05C 9/10* (2013.01); *B29L 2031/3076* (2013.01)

(56) References Cited

FOREIGN PATENT DOCUMENTS

| EP | 0889754 A1 | 1/1999 |
| GB | 1172019 | 11/1969 |
| RU | 2 220 834 C2 | 1/2004 |
| RU | 2 272 702 C2 | 3/2006 |
| RU | 2 301 140 C1 | 6/2007 |
| WO | 97/36688 A1 | 10/1997 |

OTHER PUBLICATIONS

International Search Report dated Nov. 16, 2015 in PCT/FR2015/052217 filed Aug. 18, 2015.
Russian Search Report dated Jan. 9, 2019 in Patent Application No. 2017109864/05, 3 pages (with English translation of categories of cited documents).

DEVICE AND A METHOD FOR REPAIRING A HOLE IN A PART

FIELD OF THE INVENTION

The present description relates to maintaining and repairing parts, and more particularly to a device and a method for repairing a hole in a part, in particular in a part made of composite material.

TECHNOLOGICAL BACKGROUND

In numerous technical fields, including fabricating parts for the aviation industry, fabricated parts are often pierced in order to incorporate therein inserts, screws, pins, or fastener elements. Depending on the purpose of the pierced hole, its features may differ, for example, a hole may be smoothed, spot-faced, tapped, etc. In particular when the hole is to pass and hold a fastener element, an important criterion for ensuring proper operation of the part or the assembly to which the part belongs is that the hole has the proper shape and size.

Nevertheless, holes that are pierced in parts can be damaged during the piercing operation itself or as a result of the hole being subjected to thermal or mechanical stresses while the part is in use. This applies in particular to parts made of composite material, e.g. parts comprising a woven preform embedded in a matrix. In numerous circumstances, pierced holes present defects such as flaking of the composite plies, delamination, or cracking.

At present, operations for repairing such defects are manual. For example, repairing a hole may consist in applying a resin with a brush in order to plug cavities (flaking, cracking) that have appeared at the periphery of the hole. Nevertheless, such a manual operation is difficult to perform, given the sometimes small diameter of the hole. In addition, the operation can be risky for the operator (resin is polluting), its quality is very uneven, and it is not possible to ensure that the resin that has been applied does indeed plug all of the cavity.

SUMMARY OF THE INVENTION

The object of the present invention is to remedy the above-mentioned drawbacks, at least substantially.

To this end, the present description provides a repair device for repairing a hole in a part, the device comprising a resin tank, and an injector endpiece connected to the tank, the endpiece being designed to be inserted in the hole, the endpiece including at least one injection orifice enabling resin to be injected into at least one cavity situated around the endpiece.

In the present description, and unless mentioned to the contrary, the term "resin" is used broadly to mean any hardenable fluid, thus including single- or multi-component resins, that optionally polymerizes chemically, and/or under the influence of external parameters such as temperature or pressure (e.g. thermoplastic polymers), adhesives, etc. The resin may be hardenable when hot or when cold, and it may possibly be a thermosetting resin that hardens irreversibly. The part may in particular be a composite part; the part then comprises a preform (short fibers or long fibers) embedded in a matrix, in particular a matrix that may be organic, thermoplastic, or ceramic. The preform may be woven. Under such circumstances, the perform may be a stack of two-dimensional (2D) plies or a 3D woven preform.

The hole that is to be repaired may be a smooth hole, a tapped hole, or any other type of hole. The hole that is to be repaired may present at least one of the following defects: flaking, cracking, delamination, or any defect that leads to the presence of a cavity (non-compliant absence of material) in the vicinity of the hole. The cavity opens out into the periphery of the hole. For example, the cavity is situated radially around the hole. The shape of the hole defines an axis that may be a straight line, a curved line, or a line with a bend. A radial direction is a direction perpendicular to the axis and intersecting the axis.

The above-described repair device provides a reliable technique for repairing a hole in a manner that is simple, reproducible, and safe for the operator, who does not come into contact with the resin.

If the hole is a through hole, the device may have an inlet channel between the tank and one end of the injector endpiece, and an outlet channel for placing on the other end of the injector endpiece in order to evacuate excess resin.

The present description also provides a repair method for repairing a hole in a part, the method comprising:
  inserting into the hole an injector endpiece connected to a tank and including at least one injection orifice;
  injecting a resin through the injection orifice into at least one cavity situated around the endpiece;
  hardening the resin while the endpiece remains inserted in the hole; and
  withdrawing the endpiece from the hole.

Such a method enables a hole to be repaired in a manner that is reliable, simple, and reproducible.

While injecting resin, because of the injection orifice or orifices, the resin fills all of the empty space situated in the hole around the endpiece, and in particular the cavity(ies) to be plugged that communicate with the hole. Thus, when the endpiece is withdrawn, there remains in the part a hole of shape that is substantially complementary to the outside shape of the endpiece. The shape is said to be "substantially complementary" in order to encompass the fact that the operation of withdrawing the endpiece might modify the shape of the hole a little so as to give it a shape that is slightly different from the outside shape of the endpiece.

It can thus be understood that by giving the endpiece a shape that is substantially, or indeed exactly, complementary to the desired hole, injecting resin makes it possible to form or repair the wall of the hole around the endpiece in such a manner that after the endpiece has been withdrawn, the hole is directly in a desired final shape, without requiring any additional machining. In other words, the endpiece has three functions: injecting resin into the cavity, preventing the hole itself being plugged by the resin, and imparting a desired shape to the hole after the endpiece has been extracted.

The invention is applicable to repairing both blind holes and through holes.

The endpiece may have an outside shape that is variable. Under such circumstances, the outside shape of the endpiece needs to be substantially complementary to the shape of the hole at the time the endpiece is inserted in the hole and while resin is being injected.

In certain embodiments of the above-described repair device, the repair device further includes a sealing element configured to isolate hermetically a zone of the part that includes the hole when the endpiece is inserted in the hole. The sealing element provides sealing at each open end of the hole (at one end of a blind hole, or at both ends of a through hole), in such a manner that the resin being injected into the zone that is isolated by the endpiece does not leave the isolated zone. The sealing element may perform a support function. The sealing element may involve clamping, i.e. may include one or more parts configured to hold the part in the desired shape during injection. The isolated zone including the hole also includes at least part of the injector endpiece when the injector endpiece is inserted in the hole. The sealing element may be made up of a plurality of sub-elements, in particular two sub-elements arranged at opposite ends of the hole.

In certain embodiments, the repair device further includes heater means configured for heating the resin coming from the tank. At least one of the following parts may be a heating part or may include a heater: the tank, the inlet channel, the sealing element, and the endpiece. The heater means serve to control the temperature at which the resin is injected so as to improve its cohesion with the part, so as to control the intrinsic properties of the resin, and so as to control the instant of hardening.

In certain embodiments, the repair device further includes a vacuum system configured to establish a vacuum in the isolated zone. Evacuating the isolated zone serves to remove air from the cavity and the pores between the part and the resin. The zone is thus hermetically isolated both while being evacuated and resin is being injected.

In additional or alternative manner, the device may include means for applying pressure to the resin for injection. These means for applying pressure may comprise a compressor or a resin injector, or indeed a pneumatic gun directly connected to the heater endpiece.

The endpiece is designed to be extracted from the hole after the resin has hardened (possibly only partially). In other words, the endpiece includes means for enabling it to be extracted from the hole after the resin has hardened (possibly only partially). The endpiece is thus configured in such a manner that, in spite of the resin hardening, extracting it does not damage the part around the endpiece. For example, in certain embodiments, the injector endpiece may be covered in a non-stick material, e.g. Teflon, and it may for example be made of Teflon-coated aluminum. The endpiece may be covered with said material on the outside and/or the inside (where inside and outside are defined relative to a radial direction). Other examples are given below.

Furthermore, the endpiece is of generally elongate shape in the extraction direction of the endpiece. The endpiece may in particular be generally cylindrical in shape.

In certain embodiments, the endpiece includes a bladder. A bladder is an inflatable element. The bladder may be made of any material that is compatible with the materials of the part, with the resin, and with the conditions of repair (in particular temperature and pressure). By being inflatable, the bladder may be filled with a fluid (air, water, oil, etc.) so as to increase its volume. The bladder then forms all or part of the outside wall of the endpiece. Thus, the outside shape of the endpiece can be made to match a wide variety of hole shapes, which shapes may be complex.

The bladder is configured to be put under pressure while injecting resin and until the resin has hardened; it is deflated in order to enable the endpiece to be extracted. The bladder may include at least one through orifice, forming an injection orifice, through which the resin is injected into at least one cavity.

In certain embodiments, the repair device further includes a temperature sensor and/or a pressure sensor. Such a sensor serves to follow variations in temperature and/or pressure and to verify that the injection cycle has taken place under the required conditions, in particular upstream from the isolated zone, downstream from the isolated zone, or in the isolated zone, depending on the location of said sensor. Amongst other things, monitoring temperature serves to control the hardening of the resin accurately and to verify that the polymerization temperature is appropriate. Among other things, monitoring pressure makes it possible to control the filling of the at least one cavity. The sensor may be incorporated in the sealing element; under such circumstances, the repair device is compact and easy to use.

For example, when injecting an organic resin with a pressure sensor upstream from the isolated zone, and when the resin begins to set during curing, its viscosity varies until the resin becomes hard in the channels of the repair device. At that moment, the resin can no longer flow out from the repair tooling. This leads to a "cramming" stage, which begins when an increase in pressure is measured from the endpiece. This cramming stage serves to compact the resin maximally in the zone being repaired and to limit any expansion of pores in the injected zone while the resin is polymerizing (exothermic emissions during cross-linking of organic resins).

In certain embodiments, the endpiece is configured to be disconnected from the tank. In other words, the endpiece is removable. This facilitates replacing the endpiece. Furthermore, this enables the repair device to be provided with a plurality of endpieces, each endpiece being adapted to the shape and to the internal characteristics of a particular type or caliber of hole.

In certain embodiments, the endpiece comprises a hollow body, the at least one injection orifice being arranged in an outside surface of the hollow body. The resin may be injected from the inside of the hollow body to the outside of the hollow body through the injection orifice(s). The injection orifice may be of any shape, e.g. a localized circular opening. Alternatively, or in addition, the injection orifice may extend along the length and the circumference of the endpiece (a helical type opening). The hollow body may present a plurality of injection orifices that are distributed in the outside surface of the hollow body, i.e. arranged regularly or irregularly over the entire endpiece in order to be capable of performing injection covering substantially all radial directions and/or the entire depth of the hole to be repaired.

In certain embodiments, the total area of the injection orifices is less than 40% of the outside area of the endpiece, or of the hollow body, preferably less than 35%, more preferably less than 30%, still more preferably less than 25%. This percentage gives an estimate of the torque that needs to be applied in order to withdraw the endpiece by breaking the resin that has hardened in the injection orifices.

In certain embodiments, the total area of the injection orifices is greater than 5% of the outside area of the endpiece, or of the hollow body.

In the above-described repair method, injection may be performed at a pressure that is greater than atmospheric pressure. Alternatively, or in addition, before and/or during injection, the method may comprise a step of applying a vacuum to a hermetically isolated zone including the hole. Evacuation serves both to withdraw air prior to injection, and also to eliminate pores during injection. In certain implementations, the evacuation step may last throughout injection.

In certain implementations, injection is stopped when the pressure in the isolated zone stops increasing. During a first stage of injection, the pressure increases little since the injected resin flows into the cavity (the defect) in the part, merely replacing the air that was there previously. Once all of the cavities have been filled in, the resin can no longer accumulate inside the part, so its pressure increases more strongly and then settles at a maximum value. It is then advantageous to stop injection since excess pressure might lead to further opening of the cavities, in particular when they are cracked.

In certain implementations, injection is performed at a temperature that is regulated by heater means.

In certain implementations, after withdrawing the endpiece, the method includes analyzing the core of hardened resin that remains in the endpiece. This analysis makes it possible to determine the physicochemical properties of the hardened resin and thus to estimate whether the resin that has been injected into the part does indeed have the properties expected for the repair.

In another implementation, the present description also provides a method of repairing a hole in a part, the method comprising:
- inserting an injector endpiece into the hole, the endpiece having an outside shape that is substantially complementary to the shape of the hole;
- fastening a sealing element on the part so as to isolate hermetically a zone including the hole;
- injecting resin; and
- withdrawing the sealing element and the endpiece after the resin has hardened.

BRIEF DESCRIPTION OF THE DRAWINGS

The invention and its advantages can be better understood on reading the following detailed description of embodiments of the invention given as non-limiting examples. The description refers to the accompanying drawings, in which:

FIG. 7A is a diagrammatic perspective view of an endpiece in a fifth embodiment of the invention, while

DETAILED DESCRIPTION OF THE INVENTION

Figure 1:
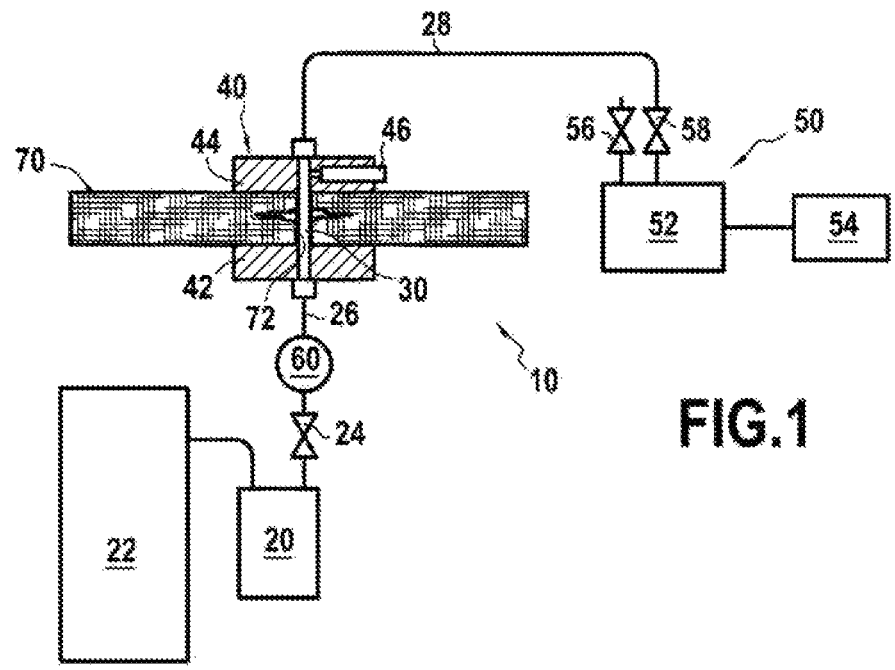
FIG. 1 is a diagrammatic general view of a repair device in an embodiment of the invention.

FIG. 1 is a diagrammatic general view of a repair device 10 for repairing a hole in a part and constituting an embodiment of the invention. As mentioned above, the repair device 10 has a resin tank 20 and an injector endpiece 30 (endpiece 30) connected to the tank 20. In FIG. 1, the endpiece 30 is shown inserted in a hole in a part 70 that is to be repaired. The endpiece 30 and the part 70 are surrounded by a sealing element 40, which is described below.

In this example, the hole in the port 70 is a through hole. At one end of the hole, the endpiece 30 is connected to the tank 20 via an inlet channel 26. At other end of the hole, the endpiece 30 is connected to a vacuum device 50 via an outlet channel 28.

A valve 24 is arranged in the inlet channel 26 to allow or prevent injection of resin coming from the tank 20. Furthermore, an injector (or pressure pot) 22 is connected to the tank 20 in order to inject resin under pressure from the tank 20. The tank 20 and the injector 22 may form part of a single piece of equipment. Finally, a heater 60 is arranged along the inlet channel, in this example between the valve 24 and the endpiece 30, for the purpose of heating the resin leaving the tank 20 before it is injected by the endpiece 30. In a variant, the device may have a plurality of heaters. In this example, the heater 60 is a device known per se. In this embodiment, the heater 60 is in the form of a metal element having at least one heater resistance that is controllable and regulatable in temperature, and through which the resin passes. The temperature of the resin at the inlet and/or outlet of the heater 60 may be measured by thermocouples (not shown). Furthermore, in the present embodiment, the endpiece 30 is itself a heater device. In a variant, the resin-passing channels may be wrapped in a heating sheath in order to limit heat losses from the channels to the outside environment between the tank and the heater endpiece. Alternatively, or in addition, the endpiece 30 and/or the part 70 that is to be repaired may be thermally protected from the surrounding outside environment by putting them in a stove or by wrapping them between heater mats.

In this example, the sealing element 40 is made up of two sub-elements 42 and 44 that are installed on either end of the hole and the endpiece 30 in order to provide sealing for the zone into which the resin is injected, and that has a vacuum applied thereto by the vacuum device 50. The sub-elements 42 and 44 are held against the part 70 and they match the shape of the part 70; for example, the sub-elements 42 and 44 may be fastened to the part 70 via suction cups. In addition to sealing, the sub-elements 42 and 44 also serve to hold the part 70 so as to avoid it being deformed during the repair process. For example, the sealing element 40 may comprise a clamping belt made of thermoplastic material and shaped to fit closely to the shape of the part 70. In another example, the sealing element 40 may comprise a clamping belt made of elastomer material so as to deform a little in order to fit closely to the shape of the part 70 without damaging the part 70. In order to avoid heat losses in the isolated zone, and as mentioned above, the sealing element 40 may itself be a heater element, or it may be heated at its periphery by heater mats or by being put in a stove.

Furthermore, a sensor 46 is placed downstream from the injector endpiece 30. In this example, the sensor 46 is a combined pressure and temperature sensor. As can be seen more clearly in FIG. 2, the sensor 46 is incorporated in the sealing element 40, more particularly in its downstream sub-element 44.

The outlet channel 28 connects the endpiece 30 to a vacuum device 50. The vacuum device 50 is conventional and known per se. The vacuum device 50 in this example comprises a vacuum trap 52 connected to a vacuum pump 54 and connected to the outlet channel 28 via a valve 58. The vacuum trap 52 is an intermediate enclosure between the endpiece 30 and the vacuum pump 54 that serves as a buffer for collecting fluids (in particular resin) that might damage the vacuum pump 54. Another valve 56 leading to the outside of the device serves to close or to open the circuit, through the vacuum trap, so as to encourage elimination of pores present in the injected resin. It is not essential to open the valve 56; tests have shown that such a step consumes a large amount of resin (lost resin). The level of vacuum that can be reached by the vacuum device may present a relative pressure of 0.7 bar, preferably 0.9 bar, preferably 0.99 bar, preferably 0.996 bar (i.e. respectively 0.3 bar, 0.1 bar, 0.01 bar, and 4 millibar (mbar) in absolute pressure).

Figure 2:
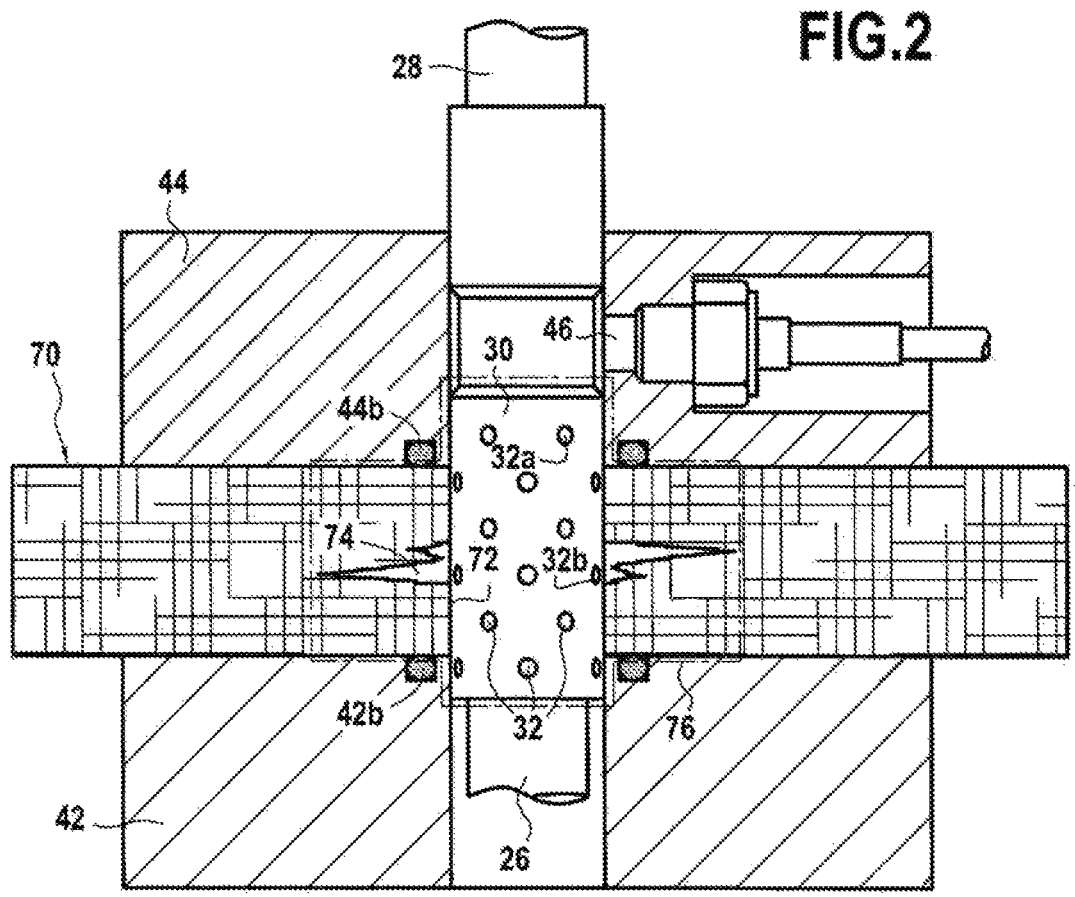
FIG. 2 is a diagram showing a detail of FIG. 1 around the injector endpiece of the repair device.

FIG. 2 shows the zone around the FIG. 1 endpiece 30 in detail. As can be seen, in this example, the part 70 is a part made of composite material, for which the preform may be a three-dimensional or two-dimensional woven preform. The part 70 includes a hole 72, a smooth cylindrical hole in this example, and while the hole was being formed a defect was created, specifically a cavity 74 (a type of delamination in this example). As mentioned above, the defect could be created while the hole 72 was being formed, or else by the hole 72 being subjected to mechanical stresses while the part 70 is in use.

In order to repair the hole 72, specifically in order to plug the cavity 74, the endpiece 30 is inserted in the hole 72. In this example, the endpiece 30 comprises a hollow body of cylindrical shape having its outside radius equal to (or very slightly smaller) the inside radius of the hole 72. Thus, the endpiece 30 matches the shape of the hole 72 that is to be repaired. The endpiece 30 has a plurality of injection orifices 32 for radially injecting resin around the endpiece 30, and in particular into the cavity 74. In this embodiment, and as shown in FIG. 2, the injection orifices 32 are distributed regularly along the height of the endpiece 30 (in its axial direction), and around the endpiece 30 (i.e. around the circumference of the endpiece 30), so as to enable the endpiece 30 to inject resin in all directions. Thus, when an injection orifice is in contact with a sealing element or with a dense portion of the part 70, as for example orifices 32a as shown in FIG. 2, then no resin can be injected through that orifice. Conversely, when an injection orifice is in communication with the cavity 74, such as for example the orifice 32b as shown in FIG. 2, then the resin can be injected through the orifice so as to fill in the cavity 74.

As shown in FIG. 2, the sealing element may include gaskets such as O-rings 42b and 44b arranged between the part 70 and respective ones of the sub-elements 42 and 44.

Figure 3:
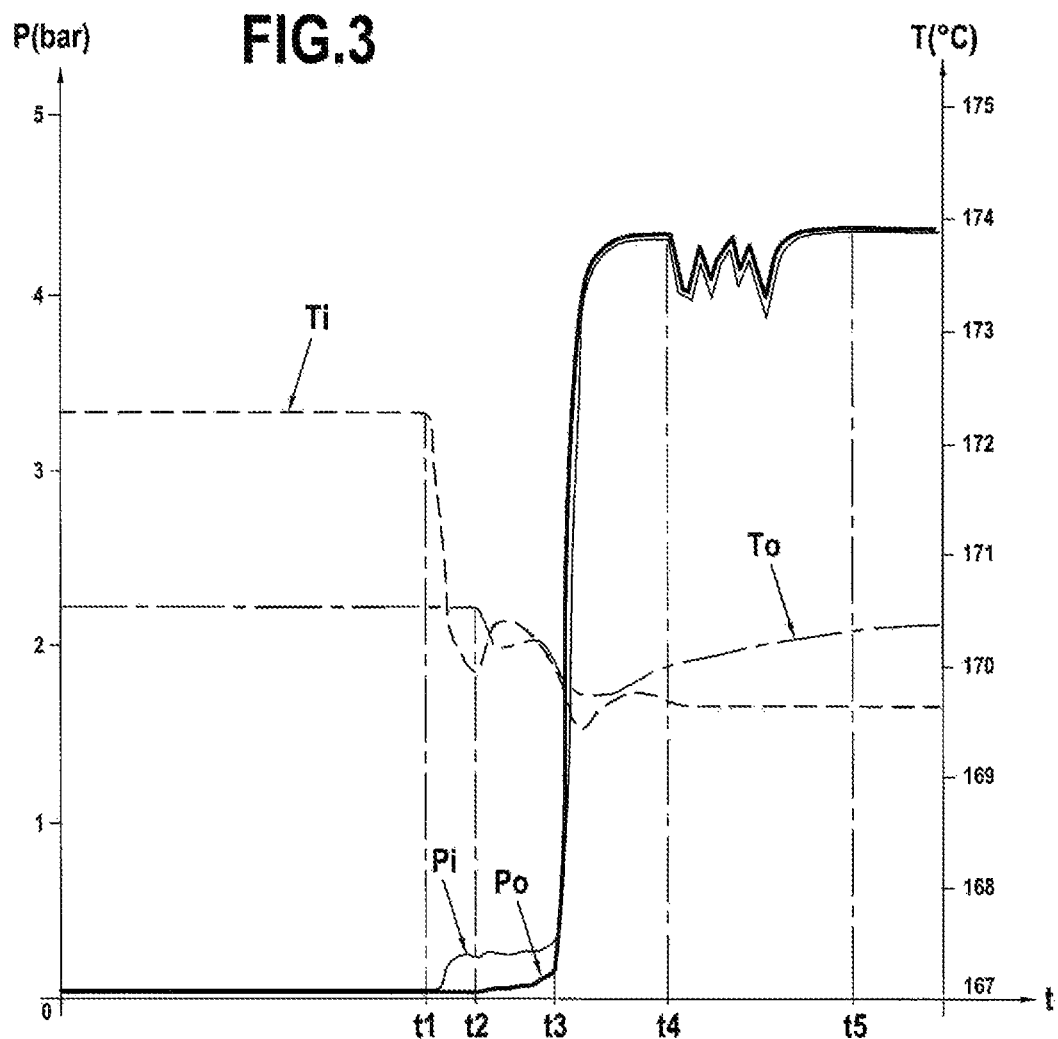
FIG. 3 shows possible variations as a function of time in temperature and pressure recorded at two points of the injector device.

With reference to FIGS. 1 to 3, a repair method that can be implemented with the repair device 10 is described below.

FIG. 3 shows the pressure Pi (fine continuous line) at the inlet of the endpiece 30 as measured by a pressure sensor at the inlet to the isolated zone, the pressure Po (bold continuous line) at an injection orifice situated in the downstream portion of the endpiece 30 (e.g. in the downstream third of the endpiece, or indeed in the downstream fifth of the endpiece, which position is referred to below as "at the outlet of the endpiece"), as measured by a pressure sensor at said injection orifice, the temperature Ti (line with uniform dashes) at the inlet to the endpiece 30, and the temperature To (chain-dotted line) at the outlet from the endpiece. The data shown in FIG. 3 was acquired over a time interval of about three minutes; nevertheless, the time taken for the repair depends on the injection flow rate and can vary depending on the quantity of resin that is injected. The temperature and pressure values are given by way of indication only.

Furthermore, in the event that it is not possible to place sensors upstream and downstream from the endpiece, it is desirable to have at least one sensor, in particular a pressure sensor, at the outlet of the endpiece. When positioned in this way, the signal returned by the sensor serves to ensure that the cavity 74 has indeed been plugged.

Once the device is installed, as shown in FIG. 1, the valve 56 is closed and the valve 58 is opened in order to establish a vacuum at the isolated zone 76. Once a vacuum is established in this zone (i.e. once a vacuum of more than 0.9 bar has been reached relative to atmospheric pressure in the isolated zone 76), the valve 24 is opened in order to enable resin to be injected into the isolated zone 76 that has previously been evacuated, which resin is preheated in the heater 60. The initial instant shown in FIG. 3 corresponds to an instant after evacuating the isolated zone 76. Specifically, the initial instant in FIG. 3 also corresponds to resin starting to be transferred from the tank.

At an instant t1, resin enters into the isolated zone and begins to fill the endpiece. The injection pressure as controlled by the pressure pot 22 is higher than atmospheric pressure, and in the present embodiment, is about 3 bar relative to atmospheric pressure. Thus, in combination with the vacuum, there may be a pressure difference of about 3.99 bar between the pressure pot 22 and the vacuum system 50. The measured temperature decreases as a result of injecting preheated resin at a temperature that is lower than the temperature of the heater endpiece 30. As can be seen in FIG. 3, the temperature To at the outlet of the endpiece begins to decrease at an instant t2 after the temperature Ti at the inlet to the endpiece decreases. The duration t2-t1 represents the time taken by the resin to go from the measurement point at the inlet to the measurement point at the outlet of the endpiece. In addition, the temperature To decreases less than the temperature Ti since the resin reaching the outlet of the endpiece is less cold because it has passed through the heater endpiece. During injection, the resin diffuses into the part 70 via the endpiece 30 having the injection orifices 32.

A sudden increase in pressure at the outlet of the endpiece 30, i.e. at the instant t3 in FIG. 3, represents the fact that the cavity 74 is completely filled. This sudden increase is represented by a sudden change in the slopes of the pressure curves in FIG. 3 at the instant t3.

At an instant t4, the valve 56 is opened in order to eliminate the pores that might have remained in the injected resin. Once resin appears in the vacuum trap 52, the valve 56 can be closed. Thereafter, resin continues to be injected via the inlet channel 24. When the pressure stabilizes at a maximum level (instant t5), injection is stopped.

The device is then left as is while the resin hardens (not shown in FIG. 3). Once the resin has hardened, the sealing element 40 and then the endpiece 30 can be removed from the part 70. The part 70 then has a hole 72 of shape complementary to the shape of the endpiece 30. If the endpiece is selected to correspond to the original hole 72, then the part 70 has a repaired hole 72 that is directly of the proper shape, without requiring any additional machining.

Finally, the repair method of the invention may include analyzing the core of hardened resin that remains in the hollow body of the endpiece. Analyzing the properties of this core serves to characterize the resin that has been injected into the cavity 74, and consequently to estimate the quality of the repair that has been done (in particular the degree of polymerization of the resin).

Alternatively, or in addition, the quality of the repair that has been done may be inspected by non-destructive inspection, in particular by ultrasound, before and/or after injecting into the repair zone in order to verify that the defective zones have been filled in. Alternatively, or in addition, it is possible to use a thermal camera to follow the path followed by the resin within the material being repaired, which resin is hot during injection.

Once the device has been installed, the above-described method may optionally be performed by a computer acting on the basis of signals returned by the temperature and pressure sensors, insofar as the various instants for starting/stopping injection or indeed opening/closing valves are characterized by remarkable changes of pressure and/or temperature that can be detected by a computer program.

Several features can be envisaged for facilitating extraction of the injector endpiece 30 without damaging the hole 72 that has just been repaired. In one example, the injector endpiece 30 may be made Teflon-coated aluminum (i.e. aluminum covered in a layer of non-stick material such as Teflon). The non-stick properties of the outside of the endpiece 30 enable the endpiece 30 to be extracted from the part 70, while the non-stick properties of the inside of the endpiece 30 enable the core of polymerized resin to be extracted from the endpiece 30.

Alternatively, or in addition, the injection orifices 32 may have thinned edges, so as to be sharp and capable of cutting through the hardened resin in the orifices 32 when the endpiece 30 is caused to turn in the hole 72. The diameter of the holes may be designed to ensure that cutting through the hardened resin does not require excessive torque and does not damage the hole 72. For example, the holes may have a diameter lying in the range 0.5 millimeters (mm) to 2 mm, and preferably being about 1 mm. The diameter of the holes may be optimized by the person skilled in the art depending on the viscosity of the injected resin. In general manner, the extractable endpiece may follow a certain path (e.g. unscrewing) in order to enable it to be withdrawn from the repaired hole without damaging it.

Alternatively, or in addition, to ensure good preparation of the surface and good cleaning of the zone to be filled in, it is possible to degrease the part 70 prior to engaging the device 10. Degreasing may be followed by stoving the part.

FIGS. 4 to 7A show other embodiments of the injector endpiece.

Figure 4:
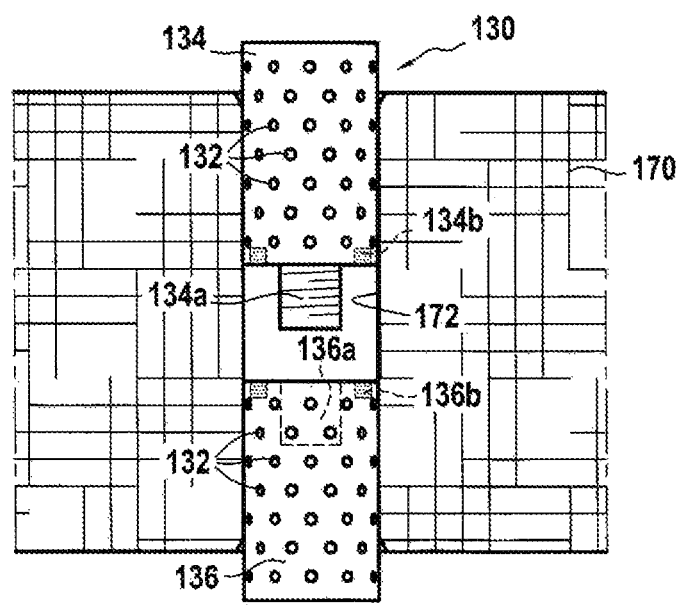
FIG. 4 is a diagrammatic section view of an endpiece inserted in the part that is to be repaired, in a second embodiment of the invention.

FIG. 4 shows an endpiece 130 made up of two portions 134 and 136 being inserted into a smooth hole 172 in a part 170. Each portion 134, 136 of the endpiece 130 is a hollow body having injection orifices 132 that are optionally similar to the orifices 32 of the endpiece 30 of the first embodiment. The portion 134 includes a threaded projecting portion 134a that is to co-operate with complementary tapping 136a provided in the portion 136. In addition, the portions 134 and 136 have respective O-rings 134b and 136b for providing sealing between the two portions 134 and 136 of the endpiece. The endpiece 130 is assembled by screwing together the two portions 134 and 136. The endpiece 130 is withdrawn by unscrewing the two portions 134 and 136 relative to each other, with turning of each portion 134, 136 having the effect of cutting the hardened resin in the injection orifices 132. The portions 134 and 136 may possess heads with sockets of shape compatible with a tightening/untightening tool such as a cruciform or torque wrench, for example.

Figure 5:
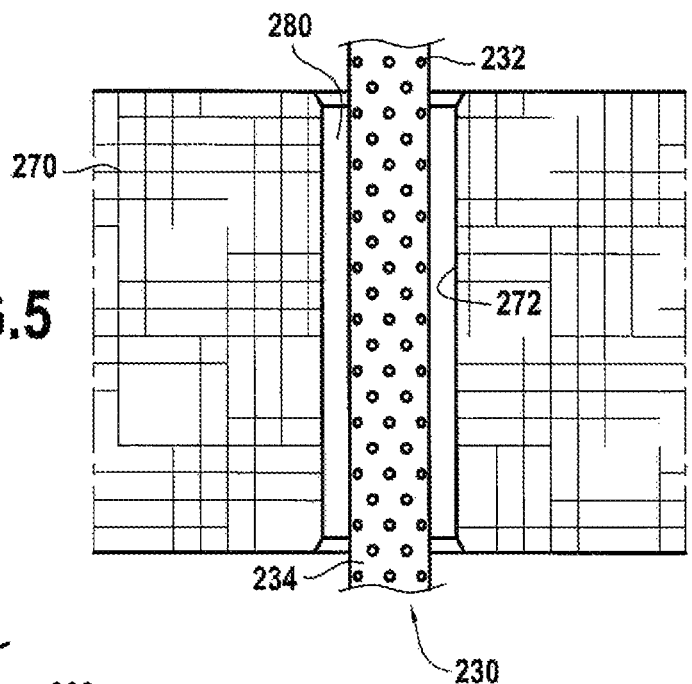
FIG. 5 is a diagrammatic section view of an endpiece inserted in the part that is to be repaired, in a third embodiment of the invention.

In another embodiment, FIG. 5 shows an endpiece 230 including a bladder 234 situated at the outer periphery of the endpiece 230. The bladder 234 is an inflatable element that is shown in its deflated state in this figure. A gap 280 thus remains between the bladder 234 and the hole 272. When the bladder 234 is inflated, it fills the gap 280 and takes up the shape of the hole 272 in which it is inserted. In this example, the hole 272 is a cylindrical smooth hole, but it can clearly be seen that this embodiment is advantageous for holes that are of irregular shape. The bladder has injection orifices 232, e.g. micropores, for injecting resin into a cavity radially to the outside of the endpiece 230. In order to withdraw the endpiece 230 from the hole 272 after the resin has hardened, it suffices to deflate the bladder. The orifices 232 in the bladder 234 are small enough for the filaments of hardened resin in the orifices 232 to be broken easily.

More generally, the bladder may be replaced by any body of variable geometry, e.g. a body having a large coefficient of thermal expansion.

Figure 6:
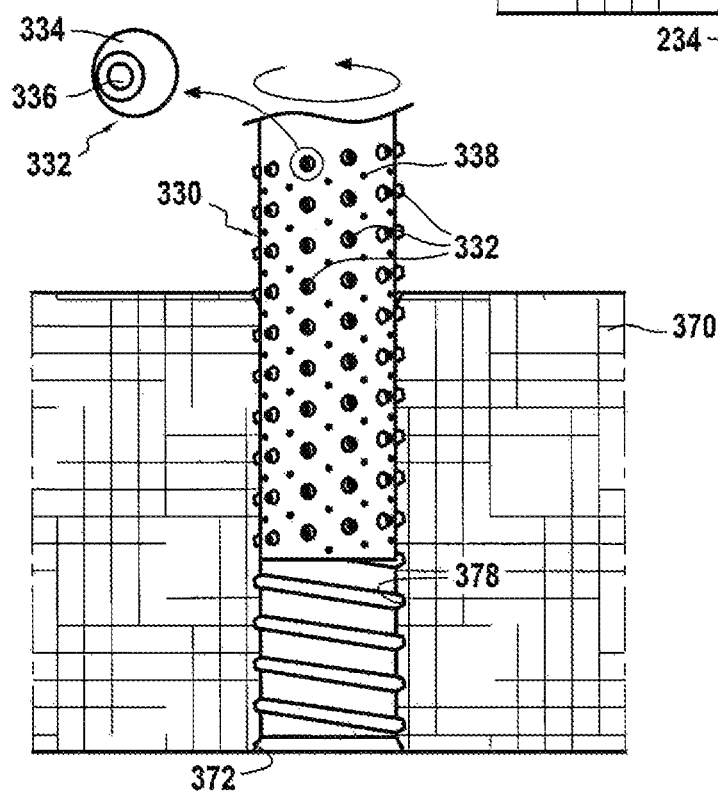
FIG. 6 is a diagrammatic section of an endpiece inserted in the part that is to be repaired, in a fourth embodiment of the invention.

In another embodiment, as shown in FIG. 6, an endpiece 330 is configured to form a tapped hole 372. As shown in the detail of FIG. 6, the endpiece 330 has a plurality of pierced studs 332, each comprising a projection 334, specifically of frustoconical shape, that is pierced by a hole 336 forming an injection orifice. The studs 332 are arranged on the outside surface of the endpiece 330 in such a manner as to reproduce the furrow of a thread. In this way, the studs 332 can co-operate with tapping 378 in the hole 372 that is to be repaired, both for inserting the endpiece 330 into the hole 372 and for extracting it (these two operations being performed by screwing or unscrewing the endpiece 330 in the hole 372). Furthermore, the endpiece 330 includes other injection orifices 338 that do not project.

Thus, in this embodiment, the outside shape of the endpiece 330 does not co-operate (does not correspond) exactly with the shape of the hole 372 that is to be repaired, since the endpiece 330 does not have a continuous thread exactly complementary to the tapping 373. In other words, the outside shape of the endpiece 330 is substantially complementary to the hole 372. That is why, while resin is being injected, it is possible that resin will fill in the tapping 378 in part. Under such circumstances, extracting the endpiece 330 by unscrewing the endpiece 330 from the hole 372 makes it possible, because of the shape of the studs 332, to re-constitute the capping 370 in the hole. Thus, after the endpiece 330 has been extracted, the hole 372 is directly of the desired shape without requiring an additional machining operation. In addition, the endpiece 330 may include means for co-operating with a tool for exerting turning torque on the endpiece 330 caught in the hardened resin. For example, one end of the endpiece 330 may be shaped to receive such a tool.

In a variant, the endpiece 330 may include a fully-formed thread with non-projecting holes formed therein similar to the holes 132 in FIG. 4.

Figure 7B:
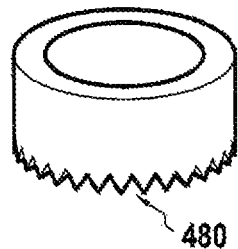
FIG. 7B shows an example of a tool enabling such an endpiece to be extracted.
Figure 7A:
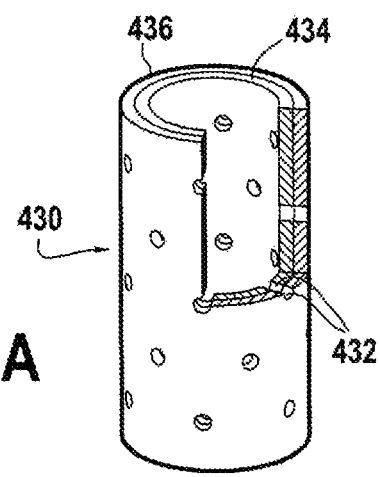

In another embodiment, as shown in FIG. 7A, an endpiece 430 comprises a hollow body 434 and a skin 436 for single use (the skin being discardable). The skin 436 is placed around the hollow body 434. The hollow body 434 and the skin 436 have orifices in alignment in order to form the injection orifices 432. After the resin has been injected and has hardened, the endpiece 430 can be extracted from the hole by destroying the skin 436 at least in part, e.g. by using a hole saw 480, as shown in FIG. 7B. By destroying only the skin 436, the hole saw 480 leaves the hole exactly the same shape as was given thereto during injection by the skin 436 defining the outside surface of the endpiece 430.

In another embodiment, the endpiece may have a hollow body similar to the hollow body 434, and a porous screen or filter surrounding the endpiece. The porous screen or filter (e.g. having micropores) serves both to diffuse the resin in uniform manner and to facilitate extraction of the endpiece.

In a variant of the above-described embodiments, as if this is possible given the nature of the resin, injection may be performed cold.

The device 10 is shown as having a single endpiece, however it could naturally have a plurality, with resin injection and/or vacuum application being shared or being performed individually.

Although the present invention is described with reference to specific embodiments, modifications may be applied to those embodiments without going beyond the general ambit of the invention as defined by the claims. In particular, individual features of the various embodiments shown and/or mentioned may be combined in additional embodiments. Consequently, the description and the drawings should be considered in a sense that is illustrative rather than restrictive.

The invention claimed is:

1. A repair device for repairing a hole in a part, the device comprising:
    a resin tank; and
    an injector endpiece connected to the resin tank, the endpiece being configured to be inserted in the hole, the endpiece including at least one injection orifice enabling resin to be injected into at least one cavity situated around the endpiece, the endpiece having a configuration to be extracted from the hole after the resin has hardened, the configuration comprising at least one of the following features:
        an outer surface of the endpiece is coated with a non-stick material,
        the endpiece includes a bladder, wherein the bladder includes the at least one injection orifice,
        a total area of the at least one injection orifice is less than 40% of an outside area of the endpiece,
        the at least one injection orifice has at least one thinned edge,
        the at least one injection orifice has a diameter lying in a range of 0.5 mm to 2 mm,
        the endpiece comprises a hollow body and a skin for single use, placed around the hollow body, and
        the endpiece comprises a hollow body and a porous screen or filter surrounding the endpiece.

2. The repair device according to claim 1, further comprising a sealing element configured to isolate hermetically a zone of the part that includes the hole when the endpiece is inserted in the hole.

3. The repair device according to claim 2, further comprising a vacuum system configured to establish a vacuum in the isolated zone.

4. The repair device according to claim 1, further comprising a heater configured to heat the resin coming from the resin tank.

5. The repair device according to claim 1, further comprising at least one of a temperature sensor or a pressure sensor.

6. The repair device according to claim 1, wherein the endpiece is configured to form a tapped hole while the endpiece is withdrawn from the part.

7. The repair device according to claim 1, wherein the endpiece is configured to be disconnected from the resin tank.

8. The repair device according to claim 1, wherein the endpiece comprises a hollow body, the at least one injection orifice being arranged in an outside surface of the hollow body.

9. The repair device according to claim 1, wherein the at least one injection orifice is configured to cut through the resin when the endpiece turns in the hole.

10. The repair device according to claim 2, wherein the sealing element includes first and second sub-elements that are installed on either end of the hole and the endpiece, and a vacuum device which applies a vacuum to the zone of the part.

* * * * *